United States Patent
Wang et al.

(10) Patent No.: US 9,356,345 B2
(45) Date of Patent: May 31, 2016

(54) COMMON ANTENNA FOR NEAR FIELD COMMUNICATION AND FREQUENCY MODULATION

(75) Inventors: Kai Wang, Shenzhen (CN); Hongtao Liu, Shenzhen (CN)

(73) Assignee: ZTE CORPORATION (CN)

( * ) Notice: Subject to any disclaimer, the term of this patent is extended or adjusted under 35 U.S.C. 154(b) by 163 days.

(21) Appl. No.: 14/239,388

(22) PCT Filed: Nov. 17, 2011

(86) PCT No.: PCT/CN2011/082379
§ 371 (c)(1),
(2), (4) Date: Feb. 18, 2014

(87) PCT Pub. No.: WO2012/151911
PCT Pub. Date: Nov. 15, 2012

(65) Prior Publication Data
US 2014/0206419 A1    Jul. 24, 2014

(30) Foreign Application Priority Data

Aug. 15, 2011    (CN) .................. 2011 2 0294857 U

(51) Int. Cl.
*H04M 1/02*    (2006.01)
*H01Q 1/50*    (2006.01)
*H01Q 7/00*    (2006.01)
*H01Q 5/335*    (2015.01)

(52) U.S. Cl.
CPC .................. *H01Q 1/50* (2013.01); *H01Q 5/335* (2015.01); *H01Q 7/00* (2013.01); *H04M 1/026* (2013.01)

(58) Field of Classification Search
CPC ........... H01Q 1/50; H01Q 1/24; H01Q 5/335; H01Q 7/00; H04M 1/026

USPC ........... 455/550.1, 552.1, 575.1, 575.7, 90.1, 455/90.3, 347, 351

See application file for complete search history.

(56) References Cited

U.S. PATENT DOCUMENTS

| 2008/0090540 | A1 | 4/2008 | Rofougaran |
| 2010/0277383 | A1 | 11/2010 | Autti |
| 2013/0023223 | A1* | 1/2013 | Rofougaran ............ H03F 3/211 455/205 |

(Continued)

FOREIGN PATENT DOCUMENTS

| CN | 201247809 Y | 5/2009 |
| CN | 101807935 A | 8/2010 |
| CN | 102104186 A | 6/2011 |

(Continued)

OTHER PUBLICATIONS

International Search Report for corresponding application PCT/CN2011/082379 filed Aug. 15, 2011; Mail date May 17, 2012.

(Continued)

*Primary Examiner* — Thanh Le
(74) *Attorney, Agent, or Firm* — Cantor Colburn LLP

(57) ABSTRACT

Disclosed is a common antenna for near field communication (NFC) and frequency modulation (FM). The common antenna comprises an antenna coil. The antenna feed line ends of the antenna coil are connected to an NFC matching circuit and an FM matching circuit, respectively. According to the disclosure, the antenna coil is connected to the NFC matching circuit and the FM matching circuit, respectively, so as to realize that the antenna is shared by the NFC and the FM, thereby reducing the costs, saving the space, and improving the product competitiveness.

8 Claims, 2 Drawing Sheets

(56) References Cited

U.S. PATENT DOCUMENTS

2013/0288740 A1* 10/2013 Gu .................. H01Q 1/243
455/552.1

FOREIGN PATENT DOCUMENTS

| CN | 102158236 A | 8/2011 |
| CN | 201928324 U | 8/2011 |

OTHER PUBLICATIONS

Written Opinion for corresponding application PCT/CN2011/082379 filed Aug. 15, 2011; Mail date May 17, 2012.
European Search Report for corresponding application EP 11 86 5359; Report dated Feb. 4, 2015.
Rick Chinn, "PADS 101, Part 1" Synergetic Audio Concepts, Inc, Mar. 1, 2004, pp. 1-4, XP055164588.

* cited by examiner

COMMON ANTENNA FOR NEAR FIELD COMMUNICATION AND FREQUENCY MODULATION

TECHNICAL FIELD

The disclosure relates to the communication field, and in particular to an common antenna for near field communication and frequency modulation.

BACKGROUND

At present, many terminal products, such as mobile phones, include the functions of near field communication (NFC) and frequency modulation (FM). A winding planar coil with a large enough area is taking as an antenna of the NFC, and the FM generally uses an external headphone cable as a reception antenna or uses a built-in mini-type Printed Circuit Board (PCB) antenna, and both the antennas thereof need to occupy a certain space. By contrasting and analysing the antennas thereof carefully, it could be found that the following features exist:

1. By means of a rough estimation, if the NFC coil winds 4 turns according to the size of 4×5 cm, then the total length of the winding is 70 cm, whereas the FM antenna generally needs 80 cm routing length according to the principle of ¼ wavelength, the two lengths are comparable.

2. The NFC and the FM are working in the vicinity of 13.56 Mhz and 100 Mhz respectively, guaranteeing that an isolation requirement there between is satisfied.

3. Both the NFC antenna and the FM antenna are required to be provided on a peripheral area or a surface area of a terminal body, away from the influence of the PCB, and the FM reception antenna does not need a very high efficiency.

On the basis of the above-mentioned features, the technical feasibility is only provided for the sharing of two antennas. At present, there is no design for a common antenna.

SUMMARY

The main purpose of the disclosure is to provide a common antenna for near field communication and frequency modulation for solving the problem that the antenna is not shared by the NFC and the FM in the relevant art.

In order to solve the above-mentioned technical problem, the disclosure provides a common antenna for near field communication and frequency modulation, and the common antenna comprises an antenna coil, wherein the antenna feed line ends of the antenna coil are connected to a near field communication matching circuit and a frequency modulation matching circuit respectively.

Preferably, the antenna coil is a winding planar coil.

Preferably, the near field communication matching circuit comprises: a first resistor and a second resistor connected in series; a third resistor and a fourth resistor connected in series; and a fifth resistor, wherein one end of the fifth resistor is connected between the first resistor and the second resistor, and the other end of the fifth resistor is connected between the third resistor and the fourth resistor; wherein the second resistor and the fourth resistor are connected to the two ends of the winding planer coil respectively.

Preferably, the frequency modulation matching circuit comprises: a sixth resistor and a seventh resistor connected in series; and an eighth resistor, wherein one end of the eighth resistor is connected to the ground, and the other end of the eighth resistor is connected between the sixth resistor and the seventh resistor; wherein one end of the winding planar coil is connected to the seventh resistor, and the other end thereof is connected to the ground through a switch; and the fourth resistor is connected to the winding planar coil through a switch.

Preferably, the frequency modulation matching circuit comprises: a sixth resistor and a seventh resistor connected in series; an eighth resistor, wherein one end of the eighth resistor is connected to the ground, and the other end of the eighth resistor is connected between the sixth resistor and the seventh resistor; wherein one end of the winding planar coil is connected to the seventh resistor, and the other end thereof is connected to the ground through a capacitor.

Preferably, the common antenna is provided on an area of a mobile phone shell away from a battery.

Preferably, the antenna coil comprises: winding planar coil of chip-type which is connected with two signal lines.

Preferably, the near field communication matching circuit comprises: a first resistor and a second resistor connected in series; a third resistor and a fourth resistor connected in series; and a fifth resistor, wherein one end of the fifth resistor is connected between the first resistor and the second resistor, and the other end of the fifth resistor is connected between the third resistor and the fourth resistor; and the frequency modulation matching circuit comprises: a sixth resistor and a seventh resistor connected in series; and an eighth resistor, wherein one end of the eighth resistor is connected to the ground, and the other end of the eighth resistor is connected between the sixth resistor and the seventh resistor; wherein the second resistor is connected to one of the two signal lines through a first switch; and the fourth resistor and the sixth resistor are connected to the other of the two signal lines through a second switch.

Preferably, the winding planar coil of chip-type is provided on a mobile phone in the form of a widget.

The disclosure has the following benefit effects: according to the disclosure, the antenna coil is connected to the near field communication matching circuit and the frequency modulation matching circuit respectively, so as to realize that the antenna is shared by the NFC and the FM, thereby reducing the costs, saving the space, and improving the product competitiveness.

DETAILED DESCRIPTION OF THE EMBODIMENTS

Figure 1:
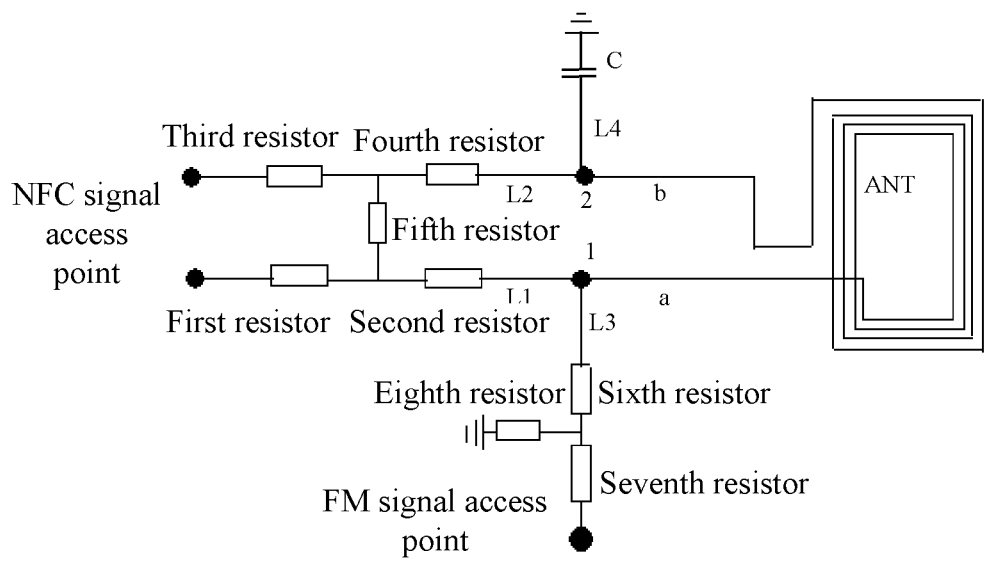
FIG. 1 is a structural schematic diagram of a common antenna for near field communication and frequency modulation in an embodiment of the disclosure.

In order to solve the problem that the antenna is not shared by the NFC and the FM in the relevant art, the disclosure provides a common antenna for near field communication and frequency modulation, and the disclosure is further described below in detail with reference to the accompanying drawings and embodiments. It should be understood that specific embodiments described herein are used to explain the disclosure rather than to limit the disclosure.

On the basis of the consideration of wire length, isolation and space, the disclosure provides that the NFC antenna and the FM antenna are shared in the same antenna carrier with a suitable shape and size, wherein the antenna carrier comprises two cases of external antenna sharing and internal antenna sharing. The antenna of the disclosure is only a metal coil, without being used by folding together with a ferrite or a wave-absorbing material, and the antenna of the disclosure can be mounted on an area of the rear shell of a mobile phone away from the battery, and also can be provided on the mobile phone as a widget.

The technical solutions of the disclosure include the following two cases:

Solution 1: the common antenna is a winding planar coil of 4 turns with the size of 4×5 cm, and is mounted on the rear shell of a mobile phone. The size and the number of turns of the winding planar coil are mainly used for controlling the routing length, and are not limited to the data given in the present embodiment. The end of the antenna feed line is divided into two branches, which are connected to the near field communication matching circuit and the frequency modulation matching circuit respectively, so that the antenna feed line ends are connected to an FM signaling pathway and an NFC signaling pathway. The FM pathway and the NFC pathway realize good duplex and isolation by adjusting their own matching circuits, wherein the frequency modulation matching circuit is equivalent to a high-pass filter, and tunes at the 100 Mhz on one hand and prevents the crosstalk of the signal from the NFC branch to the FM branch simultaneously; and the near field communication matching circuit mainly plays a resonant role, but also prevents the leakage of the FM signal simultaneously, and then the duplex multiplexing of the NFC and the FM is realized. If some matching positions are changed into manual switches suitably, the simplex mode can also be realized, the NFC and the FM can only working at time-sharing.

Solution 2: the common antenna is a mobile phone widget with a suitable size, wherein the widget is composed of a winding planar coil of chip-type and two feed lines, and there is a fastener at the end of each feed lines, and thus, whether connected to a signal node of the main-board is selected so as to realize the switching between the FM antenna and the NFC antenna.

After the forms of the above-mentioned antenna and the circuit structure are determined, the matching circuit is debugged by adjusting the size and the shape of the coil, and finally, considering the FM performance and the NFC performance is achieved simultaneously.

The above-mentioned solution is described below in detail through a specific embodiment.

As shown in FIG. 1, the common antenna coil is a winding planar coil ANT of 4×5 cm, which is mounted on an area of a mobile phone shell away from the battery, and two antenna feed line ends a and b are respectively connected to two NFC signal lines L1 and L2 of a main-board through contact points 1 and 2, and there is a matching network being reserved on L1 and L2 so as to realize the tuning of the NFC and constitutes an NFC signal branch. L1 is connected to a first resistor and a second resistor which are connected in series; L2 is connected with a third resistor and a fourth resistor which are connected in series; and one end of a fifth resistor is connected between the first resistor and the second resistor, and the other end of the fifth resistor is connected between the third resistor and the fourth resistor. The second resistor and the fourth resistor are connected to the two antenna feed line ends a and b respectively. Meanwhile, the point a is connected to an FM signal line L3 on the main-board through the contact point 1, wherein L3 is connected to a sixth resistor and a seventh resistor which are connected in series; and one end of an eighth resistor is connected to the ground, and the other end of the eighth resistor is connected between the sixth resistor and the seventh resistor. L3 is in series connection with the matching network to realize the tuning of the FM and the isolation thereof from the NFC, and the point b is connected to the ground of the main-board through a branch L4, wherein the L4 is in series connection with a capacitor C and constitutes an FM signal branch together with L3. The antenna shared by the NFC and the FM in a built-in form is realized. Further description of the circuit structure: C is a capacitor with a suitable value, which is resonant for a 100 Mhz FM, but is open for a 13.56 Mhz NFC signal; the matching networks on the branches L1 and L2 are resonant for an NFC signal, but are open for an FM signal; and the matching network on the branch L3 is resonant for an FM signal, but is open for an NFC signal. The capacitor C and the branch L3 constitute an FM signal loop circuit, which is equivalent to a high-pass filter and is resonant in the vicinity of 100 Mhz, whereas a high resistance is formed for a low-frequency signal, which ensure that the FM is able to receive a sufficient strength signal to search channels normally in the case that the efficiency of the antenna is certain on one hand, and prevent the crosstalk of the NFC signal to the FM branch so as to influence the FM effect on the other hand. After the matching debugging is finished, when the circuit works normally, the FM antenna and the NFC antenna form good duplex and isolation and can work simultaneously, then the NFC signal cannot go so far as to interfere with the reception effect of the FM, and the FM antenna is equivalent to the wire of ¼ wavelength, wherein one end of the wire is connected to the frequency modulation signal, and the other end of the wire is connected to the ground. The role of the capacitor C is very important, it not only ensures that the NFC does not loss a swiping distance due to connecting to the ground, but also provides a good grounding for the FM antenna simultaneously.

Figure 2:
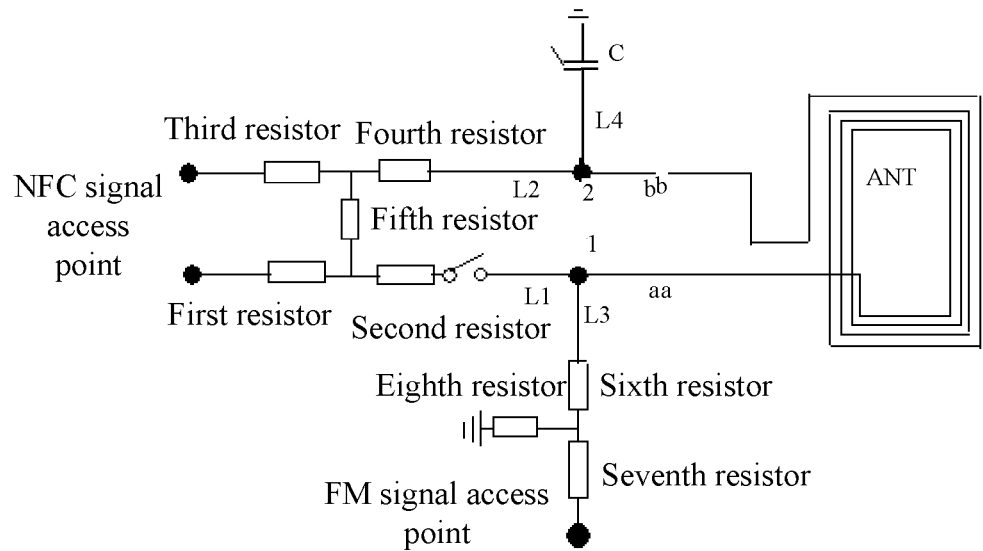
FIG. 2 is a structural schematic diagram of the other common antenna for near field communication and frequency modulation in an embodiment of the disclosure.

In addition, the embodiment of the disclosure also relates to simplification and transformation of the above-mentioned solutions: as shown in FIG. 2, on the basis of the above-mentioned solutions, a switch is connected to a branch L1 of the NFC in series again, and the capacitor C is also replaced with a switch. The swiping or listening to the FM is selected by a switch mode. In this case, the NFC and the FM cannot work simultaneously, but the amount of devices of the matching circuit and the difficulty of debugging can be greatly reduced. Note here that the switches are mainly used to realize an on-off control; hence, they can be manually physical switches, and can also be realized through software switching.

Figure 3:
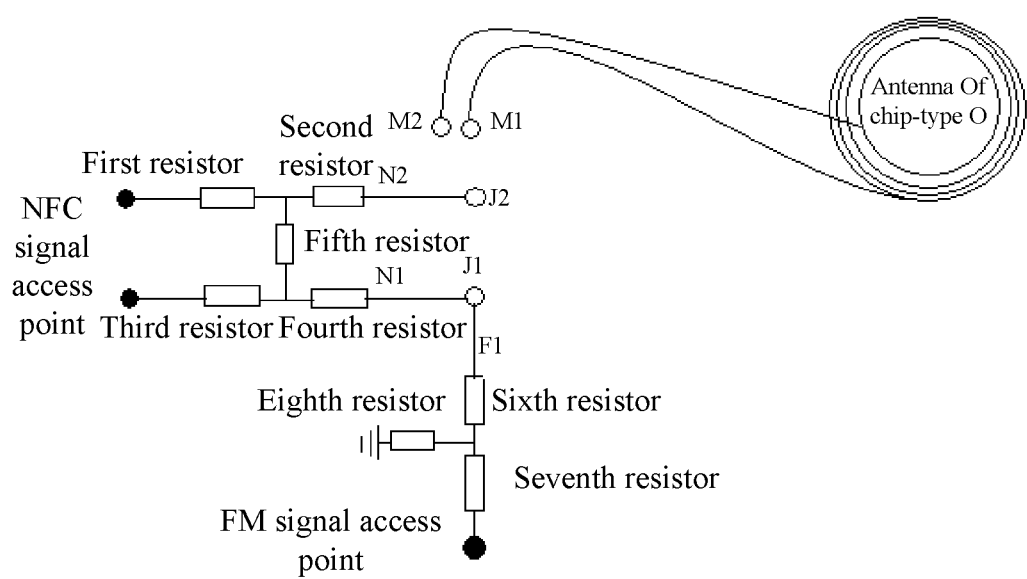
FIG. 3 is a structural schematic diagram of another common antenna for near field communication and frequency modulation in an embodiment of the disclosure.

As shown in FIG. 3, the disclosure also relates to another solution for realizing an common antenna for the near field communication and the frequency modulation, the routing of the NFC antenna and the FM antenna is shared in a widget, which is with a suitable size, of a mobile phone, the widget is composed of a winding planar coil of chip-type O and two signal lines, and the two signal lines selects connection or disconnection to the signal lines J1 and J2 on the main-board through the fasteners M1 and M2 (similar to the role of a switch for realizing the on-off control), and J1 is divided into two branches N1 and F1 on the main-board, wherein N1 is connected to one signal line of the NFC through the third resistor and the fourth resistor which are connected in series, and F1 is connected to the signal line of the FM through the sixth resistor and the seventh resistor which are connected in series; and one end of the eighth resistor is connected to the ground, and the other end of the eighth resistor is connected between the sixth resistor and the seventh resistor. J2 is connected to another signal line N2 of the NFC. N2 is connected to the first resistor and the second resistor connected in series; and one end of the fifth resistor is connected between the first resistor and the second resistor. When J1 and J2 are respectively connected to M1 and M2 simultaneously, the widget acts as the NFC antenna. When M1 is connected to J1, and M2 is disconnected, the widget is equivalent to a long wire with one end dangling and acts as the FM antenna. The antenna shared by the NFC and the FM in a built-in form is realized. Of course, in this case, the NFC and the FM cannot work simultaneously either, and when working, the FM is equivalent to a long wire with one end thereof being connected to the signal line and the other end thereof dangling.

The main point of the disclosure is to realize the sharing of the antennas of the NFC and the FM and circuit duplex, only the above three representative circuit forms are listed, but circuits based on the design principle of the disclosure are not limited to the above three, and other implementations satisfying the main point should also be included therein.

It can be seen from the above-mentioned embodiment that according to the disclosure, the antenna coil is connected to the near field communication matching circuit and the frequency modulation matching circuit respectively, so as to realize that the antenna is shared by the NFC and the FM, thereby reducing the costs, saving the space, and improving the product competitiveness.

For the purpose of example, although preferred embodiment of the disclosure has been disclosed, a person skilled in the art will appreciate that various improvements, increases and substitution are also possible; therefore, the scope of the disclosure should not be limited to the above-mentioned embodiment.

What is claimed is:

1. A common antenna for near field communication and frequency modulation, wherein, the common antenna comprises an antenna coil, wherein the antenna feed line ends of the antenna coil are connected to a near field communication matching circuit and a frequency modulation matching circuit respectively;
    wherein
    the antenna coil is a winding planar coil, and the near field communication matching circuit comprises: a first resistor and a second resistor connected in series; a third resistor and a fourth resistor connected in series; and a fifth resistor, wherein one end of the fifth resistor is connected between the first resistor and the second resistor, and the other end of the fifth resistor is connected between the third resistor and the fourth resistor; wherein the second resistor and the fourth resistor are connected to the two ends of the winding planar coil respectively; or
    the antenna coil is a winding planar coil of chip-type which is connected with two signal lines and the near field communication matching circuit comprises: a first resistor and a second resistor connected in series; a third resistor and a fourth resistor connected in series; and a fifth resistor, wherein one end of the fifth resistor is connected between the first resistor and the second resistor, and the other end of the fifth resistor is connected between the third resistor and the fourth resistor; and the frequency modulation matching circuit comprises: a sixth resistor and a seventh resistor connected in series; and an eighth resistor, wherein one end of the eighth resistor is connected to the ground, and the other end of the eighth resistor is connected between the sixth resistor and the seventh resistor; wherein the second resistor is connected to one of the two signal lines through a first switch; and the fourth resistor and the sixth resistor are connected to the other of the two signal lines through a second switch.

2. The common antenna for near field communication and frequency modulation as claimed in claim 1, wherein the frequency modulation matching circuit comprises:
    a sixth resistor and a seventh resistor connected in series; and
    an eighth resistor, wherein one end of the eighth resistor is connected to the ground, and the other end of the eighth resistor is connected between the sixth resistor and the seventh resistor;
    wherein one end of the winding planar coil is connected to the seventh resistor, and the other end of the seventh resistor is connected to the ground through a switch; and
    the fourth resistor is connected to the winding planar coil through a switch.

3. The common antenna for near field communication and frequency modulation as claimed in claim 2, wherein, the common antenna is provided on an area of a mobile phone shell away from a battery.

4. The common antenna for near field communication and frequency modulation as claimed in claim 1, wherein the frequency modulation matching circuit comprises:
    a sixth resistor and a seventh resistor connected in series; and
    an eighth resistor, wherein one end of the eighth resistor is connected to the ground, and the other end of the eighth resistor is connected between the sixth resistor and the seventh resistor;
    wherein one end of the winding planar coil is connected to the seventh resistor, and the other end of the winding planar coil is connected to the ground through a capacitor.

5. The common antenna for near field communication and frequency modulation as claimed in claim 4, wherein, the common antenna is provided on an area of a mobile phone shell away from a battery.

6. The common antenna for near field communication and frequency modulation as claimed in any one of claim 1, wherein, the common antenna is provided on an area of a mobile phone shell away from a battery.

7. The common antenna for near field communication and frequency modulation as claimed in claim 1, wherein the winding planar coil of chip-type is provided on a mobile phone in the form of a widget.

8. The common antenna for near field communication and frequency modulation as claimed in claim 1, wherein, the common antenna is provided on an area of a mobile phone shell away from a battery.

* * * * *